Oct. 19, 1926.
W. GANZ
1,603,532
LOCK FOR STEERING GEARS
Filed Sept. 22, 1922
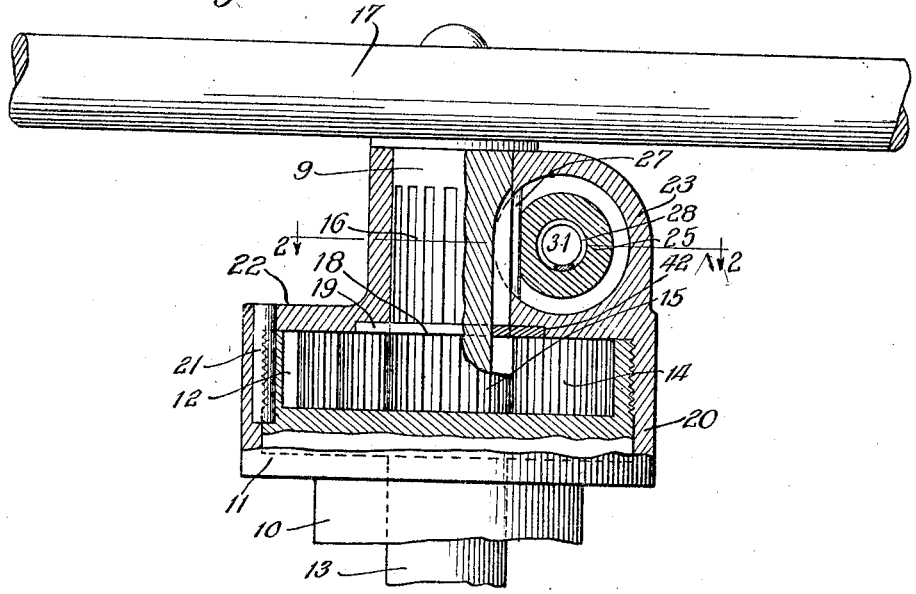
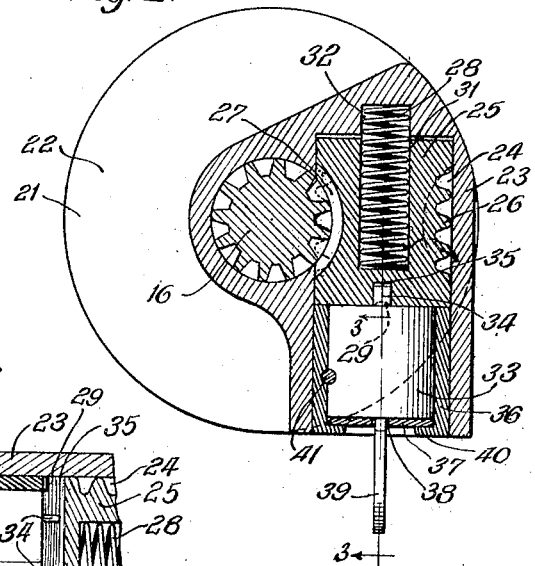
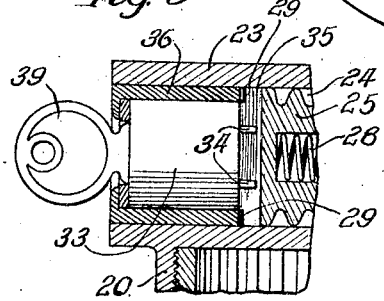
Inventor:
William Ganz
By: Wm O Belt
Atty.

Patented Oct. 19, 1926.

1,603,532

UNITED STATES PATENT OFFICE.

WILLIAM GANZ, OF CHICAGO, ILLINOIS, ASSIGNOR TO BAUER LOCK COMPANY, A CORPORATION OF DELAWARE.

LOCK FOR STEERING GEARS.

Application filed September 22, 1922. Serial No. 589,736.

This invention relates to locks for steering gears and has for its principal object to reduce the parts to a minimum in number and to so construct and arrange these as to eliminate lost motion and jamming and to provide direct and efficient action.

A further object of the invention is to provide a construction in which the locking engagement is effected by a rotary bolt acting directly on the elements to be locked and rotated directly by a cylinder lock.

Further objects of the invention will become apparent as the description is read in connection with the accompanying drawing illustrating a selected embodiment of the invention and in which—

Fig. 1 is a vertical section of a steering gear lock embodying the invention.

Fig. 2 is a transverse section on the line 2—2 of Fig. 1.

Fig. 3 is a transverse section on the line 3—3 of Fig. 2.

In the drawings I have illustrated the invention as applied to a steering gear including planetary gearing. The reference numeral 10 indicates a steering column having at its upper end a gear housing 11 equipped on its inner circumference with gear teeth 12. Journalled within the steering column is a steering shaft 13 carrying at its upper end planet gears 14 which mesh with the teeth 12 and the sun gear 15. This sun gear is carried by a spindle section 9 having an upwardly projecting shank on which the steering wheel 17 is mounted. For convenience in manufacture the teeth of the gear 15 are extended upwardly on the reduced portion of the spindle section as indicated at 16. A washer 19 is slipped over the teeth 16 and rests against the shoulder 18 at the upper edge of the gear 15, and thus prevents removal of the spindle and sun gear.

The usual cap for the gear housing is replaced by a special cap 20 threaded thereon in the customary manner and locked in place by a suitable number of hardened steel pins 21 driven to a position flush with the upper surface 22 of the cap. A boss 23 on one side of this cap is chambered at 24 to receive a rotary bolt 25 adapted in one position to engage the teeth 16 to lock the steering gear against operation and in another position to release the spindle section 9 and permit the steering gear to be operated. As shown this bolt is equipped with a plurality of ribs 26 cut away as indicated at 27 so that in one position it is firmly engaged with the spindle and in another position it permits the spindle to rotate freely.

The bolt is rotated by a cylinder lock here shown as including a barrel 33 having thereon a rotatable plug equipped with a transverse key or spaced lugs 34 which seat in a corresponding groove 35 in the adjacent end of the bolt. This construction provides a very strong and direct connection between the plug and bolt.

To protect the lock from drilling or other destructive action it is preferably mounted in a jacket 36 of hardened steel and covered on the face by a disc 37 of the same material. The disc lies inside of the overlapping flange 40 on the jacket and rotates with the plug. The slot 38 for the key is the only opening at the front of the lock. Preferably the lock barrel and the jacket are secured in place in the cap by a transverse pin 41 as indicated in Figure 2. A suitable recess 42 is provided in the cap 20 to receive the washer 19.

In the preferred construction the bolt 25 is permitted a slight amount of longitudinal movement which is resisted by a spring 28 seated partly in the chamber 31 in the bolt and partly in the chamber 32 in the cap. The jacket 36 is equipped with one or more lugs 29 having cam surfaces adapted to coact with the walls of the slot 35 to latch the bolt against automatic rotation. These lugs need not be of any great height, for a very slight engagement between the jacket and the bolt will be sufficient. When pressure is put on the key 39 the bolt rides over the cam faces on the lugs and rotates freely until the lugs again align with the slot when it becomes automatically latched.

The spindle section 9 may be provided with a variety of engaging devices other than the teeth shown at 16 for cooperation with devices similar to the ribs 26 on the bolt but by making the teeth of the sun gear 15 extend upwardly and form the teeth 16 the new spindle part can be cheaply and efficiently manufactured.

By the use of a single rotary bolt acting directly on the part of the steering gear to be locked and operated directly by a cylinder lock the device is reduced to a minimum number of parts and the action and operation thereof is direct and efficient. The key and groove connection between the bolt and the lock plug is strong and reliable and gives uniform power to the key. The bolt having principally rotating movement and being strongly engaged with the lock is practically free from any appreciable friction and it has no tendency to bind or jam in its chamber. The spring 28 and the lugs 29 will hold the bolt in either operative or inoperative position until the proper pressure is exerted on the key when they will release and permit the bolt to be rotated to the other position and there automatically latched.

The ribs 26 are the preferred construction because of the ease in manufacture, but it will be clear that a variety of devices may be used in place of them to effect the locking engagement with the spindle.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claims.

I claim:

1. In a steering gear, a steering column, a steering shaft within said column and carrying a plurality of gears at its upper end, a spindle carried by said column and adapted to support a steering wheel, a gear on said spindle meshing with said first named gears, said spindle extending above said gears, and being provided with a plurality of teeth on its surface, and rotatable locking means carried by said column and disposed above said gears, said locking means being adapted to positively engage said teeth on said spindle and to lock said spindle against rotation in either direction.

2. In a steering gear, the combination of a plurality of independent elements one of which is rotatable to steer the vehicle, means for locking said elements together including a rotary bolt having peripheral means adapted to engage one of said elements, yielding means to hold said bolt against movement, and a barrel lock for moving said bolt to operative position.

3. In a steering gear, the combination of a steering column, a steering shaft rotatably mounted thereon, a rotatable locking bolt carried by the steering column, means carried by the bolt for effecting a locking engagement with said shaft, a barrel lock for rotating said bolt, and means for automatically holding said bolt against accidental movement.

4. In a steering gear, the combination of a steering column, a steering shaft rotatably mounted thereon, a rotatable locking bolt mounted in the steering column and adapted to lock the steering shaft thereto, resilient means for moving the bolt lengthwise to yieldingly hold it against rotation, and a lock for rotating said bolt.

5. In a steering gear, the combination of a steering column, a steering shaft rotatably mounted thereon, a rotatable locking bolt mounted in the steering column adapted to lock the shaft thereto, resilient means for moving the bolt lengthwise, cam lugs for engaging the bolt, and a lock for rotating the bolt.

6. In a steering gear, the combination with a steering column and a rotatable steering shaft contained therein, of means for locking the steering shaft to the column and including a barrel lock rotatably mounted on the column, a rotatable bolt separate from the barrel lock and having limited endwise play with respect to the barrel lock, an operative connection between the barrel lock and the bolt to permit of endwise play of the bolt, the bolt having a latch engagement with a stationary part at the inner end of the bolt and a spring yieldably holding the bolt in its latched position.

7. In a steering gear, the combination with a steering column and a rotatable shaft mounted therein, of means for locking the shaft to the column, said means including a bolt rotatable into and out of locking engagement with the shaft and also having a limited endwise movement, a barrel lock, an operative connection between the barrel lock and the bolt to permit endwise play of the latter, a stationary casing for the barrel lock, a projection and socket interlocking engagement between the bolt and the casing, the endwise play of the bolt permitting the bolt to be disconnected from the casing, and a spring yieldably holding the bolt interlocked with the casing.

8. In a steering gear, the combination of a steering column and a rotatable shaft therein, of means for locking the shaft to the column, said locking means including a bolt which is rotatable into and out of locking engagement with the steering shaft, a barrel lock having a stationary casing, the inner end of the bolt having a diametric slot, the inner end of the barrel lock having a key working in the slot for rotating the bolt, the lock casing having a projection engaging the groove of the bolt to prevent rotation thereof, the bolt being movable endwise to disengage the walls of the groove from the projection on the casing to permit rotation of the bolt by the lock, and spring means yieldably maintaining the groove of the bolt engaged with the projection of the casing.

WILLIAM GANZ.